Sept. 29, 1970        S. O. GEESE        3,531,754
POTENTIOMETER
Filed March 17, 1969
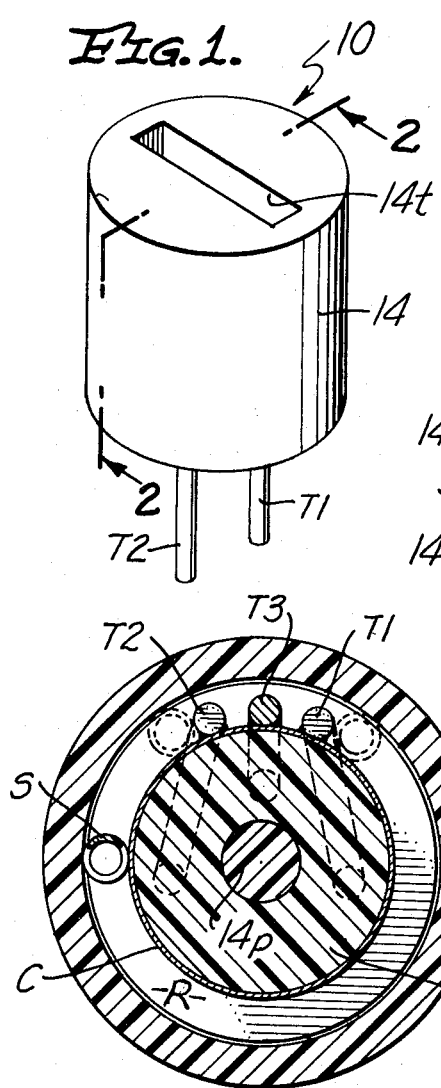
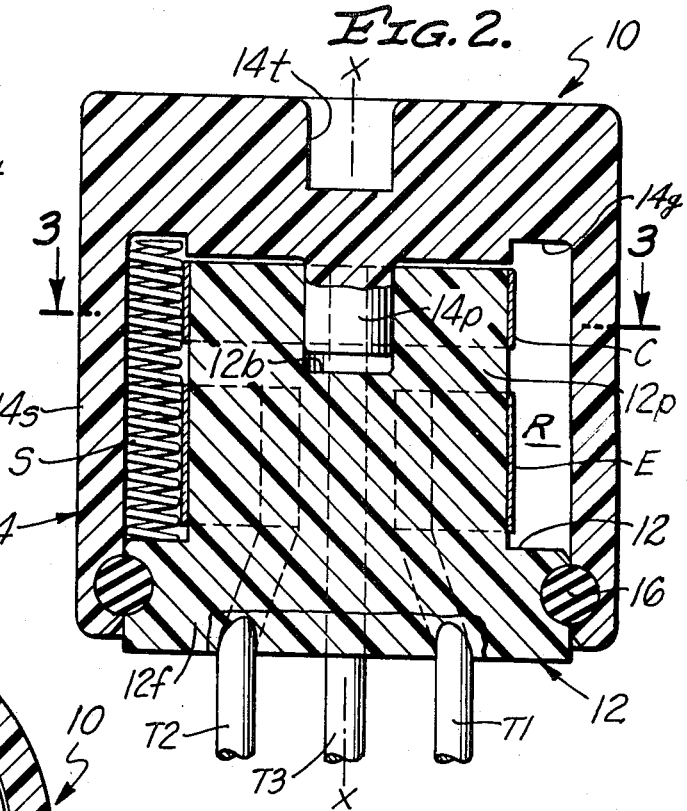
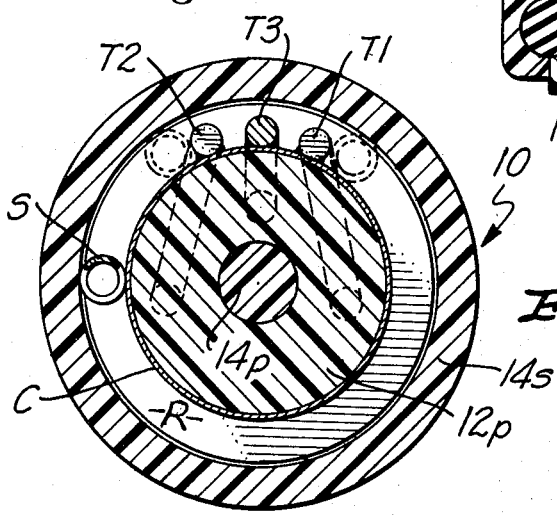
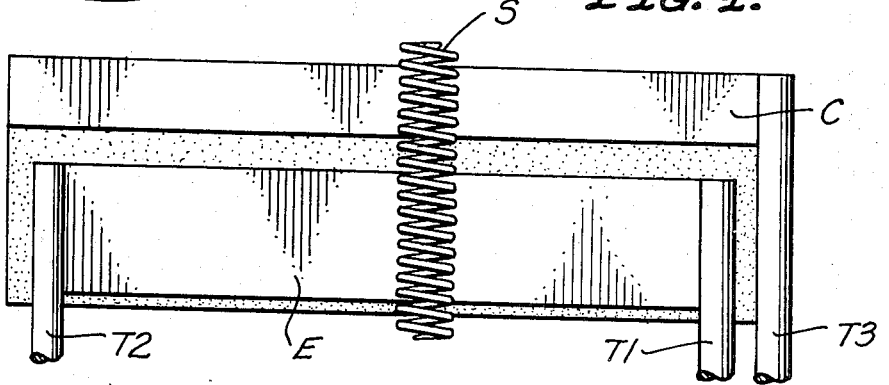
INVENTOR
STEFAN O. GEESE
BY

United States Patent Office 3,531,754
Patented Sept. 29, 1970

3,531,754
POTENTIOMETER
Stefan O. Geese, Monterey Park, Calif., assignor to
Bourns, Inc., a corporation of California
Filed Mar. 17, 1969, Ser. No. 807,698
Int. Cl. H01c 9/00
U.S. Cl. 338—157                                    4 Claims

ABSTRACT OF THE DISCLOSURE

A variable resistor of the potentiometer type of very small size having superior resolution, very low contact-resistance and very inexpensive construction permitted by reduction of the number of parts and by utilizing a coil spring as a combined speed-reducer and rolling wiper or contact which provide a maximum number of independently-resilient points of contacts throughout the entire width of a flat-surfaced resistance element.

CROSS-REFERENCE TO RELATED APPLICATION

In respect of certain features of the present invention this application is related to the contemporaneously filed application of the same inventor, Ser. No. 807,700.

BACKGROUND OF THE INVENTION

Prior art miniature variable resistors of the single-turn rotary adjustment potentiometer type are characterized by difficulty of obtaining a precise adjustment, relatively high contact-resistance-variation (CRV), low values of maximum total resistance (TR) and poor operating longevity in high TR ranges. Since adjustment is effected by rotation of a slider-carrying rotor by means such as a very small screwdriver, accurate adjustment was difficult to obtain, especially in potentiometers of high total resistance. The adjustment from lowest to zero value of effective resistance or potential to the highest or maximum value is effected by less than one complete revolution of the rotor and driver, hence the change of effective resistance produced by even a very small rotational movement of the rotor is relatively great in a high-resistance potentiometer, and due to the smallness of the rotor, precise adjustment of the movable contact was difficult if not impossible. And since the wiper or contact was a formed sheet-like member having two or three fingers (or only one finger in some cases), contact resistance variation during adjustment was relatively high because of inability of the contact or contacts to follow many of the surface irregularities of the resistance element. Difficulty was experienced in producing accurately identical plural-finger contacts of very small size, and only at considerable cost per unit were satisfactory contacts produced. Additional expense was incurred in accurately securing the contact to the rotor. Assembly of the very small components was difficult, involving accurately positioning a rotor unit on a bearing; and applying and securing a cover or cap over the assembled operating parts added to the difficulties and expense. One of the reasons for non-linear variation of resistance or potential division incident to rotation of the adjustment device or rotor, especially in extremely small single-turn adjustment potentiometers, was the inability of the wiper or contact to brush the entire width of the resistance element. That undesirable feature was accentuated as the wiper approached either electrical end of the element.

SUMMARY OF THE INVENTION

The present invention has an object or objects the provision of means and an arrangement thereof whereby all of the above-noted undesirable characteristics and features of the prior art are eliminated or obviated. The invention attains the intended objectives in part by provision of a base of circular plan form having an upstanding cylindrical portion which defines an axis and provides a surface around which are affixed or deposited a conductive collector strip or film and an elongate wide resistive layer or film such as a cermet element. In part the objectives are attained by providing a hollow inverted cup-like cover or cap rotatable about the noted axis and on bearing means provided in common by the cap and the base. Further, the objectives of the invention are attained in part by providing in the interior of the generally cylindrical cap a cylindrical surface concentric with the element-supporting surface of the base and spaced outwardly of the axis therefrom, and positioning between the two noted cylindrical surfaces a conductive helical spring contact device the axis of which is parallel to the potentiometer axis of rotation and which frictionally engages the two concentric cylindrical surfaces and rolls along both such surfaces incident to rotation of the cap on the base and thus connects the conductive collector to various selected transverse zones along the extent of the resistance element. The spring, each turn of which is in a sense an individual contact acting on and along the element, contacts the element over the entire width of the latter and hence avoids current-path constriction adjacent the electrical ends of the element and thus avoids non-linearity of change of resistance. Additionally, CRV is reduced to the minimum value feasible of attainment, due to the multiplicity of separate element-engaging contacts. Due to the cap being the contact moving device and to the rolling of the spring on a cylindrical surface of considerably smaller diameter than that of the actuating surface, there is effected a reducing-gear action whereby the cap must rotate through a much greater angular distance about the axis than does the spring contact as the latter device moves from one end of the element to the other. Thus accuracy or precision of adjustment of the potential-division or resistance is considerably improved over that attained by prior art single-turn adjustment potentiometers. The accuracy of setting or adjusting of the potentiometer is limited to the smallest movement of the wiper that can be manually effected. The fact that the cap rotates through nearly twice the angle the spring contact moves about the potentiometer axis during adjustment of the resistance permits much finer or more accurate adjustment.

Due to the facts that the contact is a simple inexpensively formed device which can be manufactured rapidly with great precision, that the cap or cover can readily be made as a simple casting or molded part, and that the base is formed as a simple part with inserted terminal pins two of which provide end stops for limiting movement of the spring contact and upon which the element and collector are readily produced, the potentiometer is very inexpensive yet rugged and durable. Due to the nature and physical arrangement of the parts the instrument can be made in exceptionally small sizes. An exemplary form of the invention is illustrated in the accompanying drawings.

DESCRIPTION OF THE DRAWINGS

FIG. 1 is a pictorial view, to a grossly enlarged scale, showing an exemplary potentiometer embodying the invention in exemplary form;

FIG. 2 is a sectional view, to a larger scale, of the potentiometer illustrated in FIG. 1, depicting internal details, the section being as indicated in FIG. 1 by directors 2—2;

FIG. 3 is a transverse horizontal sectional view of the potentiometer illustrated in section in FIG. 2, the section being as indicated by directors 3—3 in that drawing; and FIG. 4 is a diagram indicating relative relationships of terminals, collector, resistance element, and helical spring contact, the collector and element having been brought into flat plan disposition for purposes of illustration.

DESCRIPTION OF THE PREFERRED EMBODIMENT

In the drawings the exemplary potentiometer is denoted by number 10 and is in the form of a rotary, pin-mounted variable resistor. The potentiometer 10 comprises as principal components a base 12 formed of insulation such as steatite or alumina, and a cap 14, also of insulation such as molded synthetic resin. The base is formed with a lower circular platform or foot 12f and in integral cylindrical post 12p coaxial with the foot and having a cylindrical hole or bore 12b formed in the center of its upper end. The base also has a peripheral groove 12g formed in foot 12f, for reception of a retainer and seal member 16 as indicated in FIG. 2. The bore 12b is coaxial with post 12p and foot 12f and therewith provides or defines an axis which is herein termed the potentiometer axis.

Cap 14 is of inverted cup-shape, and is adapted to rotate on the base about the axis $x$—$x$ (FIG. 2), by virtue of an integral pin 14p extending downwardly from the body of the cap about the axis, and which pin fits in the complementary blind bore 12b of the base; and by virtue of the lower skirt or rim of the cap being formed to closely fit over foot 12f of the base and over the retainer member 16 and to slide thereon. The cap is formed with a shallow annular groove 14g around its interior next to the base of skirt 14s (FIG. 2). Also, the exterior top of the cap is provided with a groove or slot 14t for reception of an actuating tool such as a screwdriver.

Formed or deposited on the cylindrical surface of the post 12p of the base is an elongate resistive strip or film element E which is of the form of a wide stripe or a curved strip. The element may be of cermet, and its ends, as shown in FIG. 3, are in electrical contact with respective terminal pins T1 and T2. The pins may be molded in place in the base, or inserted and sealed in bores formed in the base; and electrical connection to the element E effected across the entire width of the latter by solder, conductive cement, or other known means. Thus the element is an elongate resistive device of film-like nature having first and second spaced-apart electrical ends at terminals T1 and T2. Also formed around post 12p, above and spaced from element E, is a conductive strip or film to provide a return conductor or collector C. Conveniently the collector may completely encircle post 12p; but whether continuous or having slightly spaced-apart ends, is conductively connected to a third pin terminal T3, either by direct contact therewith or by being soldered, brazed or welded thereto, or by being connected thereto by conductive cement. Terminal T3, like the previously described terminals T1 and T2, may be molded-in, or drawn into and sealed in an appropriately formed passage as indicated. As is indicated in FIGS. 2 and 3, the upper protruding ends of terminals T1 and T2 do not extend above the uppermost edge of element E, but each electrically connects with the element across the entire width of the element. Also, as indicated in the diagram of FIG. 4 showing the collector C and element E in developed form, the element is shorter than the collector. Thus, as indicated in FIG. 3, terminals T1 and T2 are spaced apart, whereby terminal T3 may extend upwardly therebetween yet be spaced from, and insulated from, both of the resistance element terminals.

The constructions and configurations of base 12 and cap 14 are such that there is produced between them, around post 12p and inside skirt 14s, an annular chamber R (FIGS. 2 and 3) whose ceiling is provided by the base of annular groove 14g (FIG. 2) and whose floor is formed by the shelf 12s between post 12p and foot 12f of the base. As may be seen by reference to FIG. 2, the element and collector are disposed, in a sense, in the chamber, as are the upper ends of the three terminals.

Mounted in chamber R, with its axis parallel to axis $x$—$x$ of the potentiometer, is the novel contact device S, according to the invention. The contact is a resilient helical spring of conductive material, such as wire, and while illustrated in the drawings as a somewhat opened spring for clarity in illustration, it may be formed with the coils or turns nearly or substantially closed. As herein shown, the spring is formed of wire of round cross-section, but in instances wherein a maximum of contact-surface is essential or desired, wire of cross-section such as to provide a flat outer surface profile, such as rectangular wire, or triangular wire, may be used. The contact device is arranged and adapted to be rolled along the extent of the element and collector, between terminals T1 and T2 and in contact across the widths of both the collector and element, whereby to electrically connect any selected transverse contact zone of the element with the conductive collector. To permit and effect such rolling, the spring is dimensioned to fit snugly in chamber R, in frictional engagement with the inner cylindrical surface or wall of skirt 14s of the cap. Thus as the cap is rotated, relative to the base and about axis $x$—$x$, the spring rolls along the inner wall of the skirt and is rolled along the element and collector. Such traversing of the spring or contact along the element is limited, in either direction, by a respective one of the element terminals T1 and T2, which serve as stops for the contact. If rotation of the cap is continued beyond the extent required to rotate the contact to either limit of its travel, the cap may slide over the contact, or the contact will rotate idly against one of the stops, dependent upon the relationship of the friction coefficients between the spring and the element-collector and the cap. The annular shelf 12 and the annular groove 14g serve to aid in stabilizing the contact; and each time the contact is adjusted to either of its extreme positions (indicated by dotted line or in phantom in FIG. 3, adjacent to terminals T1 and T2), the spring is brought with its axis precisely transverse to the element and collector.

As will be evident to those skilled in the art, to rotate the contact a unit of angular traverse about axis $x$—$x$ and along the element, cap 14 must be rotated through considerably more than one angular unit, that is, through nearly two angular units; and thus greater precision in positioning the contact along the element is afforded. Further, it is evident that both the cap and the base are susceptible of inexpensive construction, and that the contact is very simple and inexpensive. Also it is evident that with the skirt 14s compressively pressing each convolution of the contact inwardly against the collector and the element, each convolution across the width of the element acts as an individual resilient contact and follows minute irregularities of the element surface, whereby excellent contact over the contact zone is afforded, reducing CRV and providing uniform widthwise distribution of current in the element.

Having thus described the preferred physical embodiment of the principles of the invention, I claim:

1. A potentiometer comprising:
   first means, including a base means having a circular foot portion and an upstanding cylindrical post portion coaxial with said foot portion;
   second means, including a cap means of inverted-cup configuration supported upon said base means for rotation about said axis, said cap means comprising a skirt portion having an interior cylindrical surface concentric with and spaced radially outwardly from said cylindrical post portion to provide an annular chamber closed by said cap means and said base means;
   third means, including a flat curved resistance element having first and second ends and mounted on said post portion, and first and second terminal means carried by said base means and each connected to a respective end of said element;

fourth means, including a resilient helical conductive spring contact device disposed in said chamber in frictional compressive engagement with said skirt and said element with a plurality of the convolutions thereof engaging said element, whereby rotation of said cap means about said axis effects rolling of said contact device along said element; and fifth means, including a third terminal means and means connecting said contact device to said third terminal means.

2. A potentiometer according to claim 1, in which said cap means and said post have cooperating bearing means, and said foot portion and said skirt portion have cooperating bearing means, said bearing means confining rotation of said cap to rotation about said axis.

3. A potentiometer according to claim 2, including annular retainer-seal means for retaining said cap means to said base means, said base means and said cap means each comprising a portion forming a respective annular groove of form and dimension to accommodate a portion of said retainer-seal means, said annular retainer-seal means engaging said cap means and said base means in the annular groove of each thereof and effective to seal said chamber against ingress of undesired foreign material.

4. A potentiometer according to claim 2, said cap means comprising tool-engaging means for facilitating accurate rotation of said cap means relative to said base means.

References Cited
UNITED STATES PATENTS

| | | | |
|---|---|---|---|
| 3,076,162 | 1/1963 | Ferrari | 338—168 X |
| 3,219,960 | 11/1965 | Volkmann | 338—157 |
| 3,259,727 | 7/1966 | Casler | 338—183 X |
| 3,453,584 | 7/1969 | Hanson | 338—202 X |
| 3,484,734 | 12/1969 | Casey et al. | 338—184 X |

LEWIS H. MYERS, Primary Examiner

D. A. TONE, Assistant Examiner

U.S. Cl. X.R.

338—202, 184